(12) United States Patent
Schonewille et al.

(10) Patent No.: US 11,774,620 B2
(45) Date of Patent: Oct. 3, 2023

(54) INTERPOLATION OF SEISMIC DATA WITH TIME VARIANT LOCATIONS

(71) Applicant: Schlumberger Technology Corporation, Sugar Land, TX (US)

(72) Inventors: Michel Schonewille, Gatwick (GB); Robert Bloor, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 829 days.

(21) Appl. No.: 16/461,391

(22) PCT Filed: Dec. 16, 2016

(86) PCT No.: PCT/US2016/067068
§ 371 (c)(1),
(2) Date: May 16, 2019

(87) PCT Pub. No.: WO2018/111288
PCT Pub. Date: Jun. 21, 2018

(65) Prior Publication Data
US 2020/0057170 A1 Feb. 20, 2020

(51) Int. Cl.
*G01V 1/50* (2006.01)
*E21B 47/14* (2006.01)
*E21B 47/003* (2012.01)

(52) U.S. Cl.
CPC .............. *G01V 1/50* (2013.01); *E21B 47/003* (2020.05); *E21B 47/14* (2013.01); *G01V 2210/48* (2013.01); *G01V 2210/56* (2013.01); *G01V 2210/671* (2013.01)

(58) Field of Classification Search
CPC ........ G01V 1/36; G01V 1/50; G01V 2210/48; G01V 2210/671; G01V 2210/57; G01V 2210/59; G01V 2210/56; E21B 47/003; E21B 47/14
See application file for complete search history.

(56) References Cited

U.S. PATENT DOCUMENTS

| 5,050,129 A | 9/1991 | Schultz |
| 5,504,678 A * | 4/1996 | Juszczak ............. G01V 1/28 702/14 |
| 8,582,395 B2 | 11/2013 | Ferber |
| 2012/0113747 A1 | 5/2012 | Ferber |

(Continued)

OTHER PUBLICATIONS

International Preliminary Report on Patentability issued in the related PCT Application PCT/US2016/067068, dated Jun. 27, 2019 (7 pages).

(Continued)

*Primary Examiner* — Elias Desta
(74) *Attorney, Agent, or Firm* — Jeffrey D. Frantz

(57) ABSTRACT

Systems, computer readable, and methods concern receiving seismic data representing a subsurface volume. The method also includes determining, for the seismic data, analysis coordinates as a function of time. One or more of the analysis coordinates may vary in position over time. The method includes performing at least one of an interpolation or regularization process on the seismic data based at least partially on the analysis coordinates. The method also includes outputting a result of the at least one of the interpolation or regularization process.

17 Claims, 10 Drawing Sheets

(56) References Cited

U.S. PATENT DOCUMENTS

2015/0226867 A1\* 8/2015 Tonchia ............... G01V 1/3808
367/20
2016/0047929 A1 2/2016 Hegna et al.
2016/0187513 A1 6/2016 Poole et al.

OTHER PUBLICATIONS

International Search Report and Written Opinion issued in the related PCT Application PCT/US2016/067068, dated Feb. 14, 2017 (10 pages).
Daniel Trad, Implementations and Applications of the Sparse Radon Transform, PHD Thesis, The University of British Columbia, Sep. 2001 (233 pages).
The extended Search Report issued in the EP Application 16924145.2, dated Jul. 13, 2020 (8 pages).
Hampson G. et al: "The effects of source and receiver motion on seismic data", Geophysical Prospecting, Oxford, GB, vol. 43, No. 2, Feb. 1, 1995, pp. 221-244.
Communication Pursuant to Article 94(3) issued in European Patent Application No. 16924145.2 dated Jul. 29, 2022, 6 pages.

\* cited by examiner

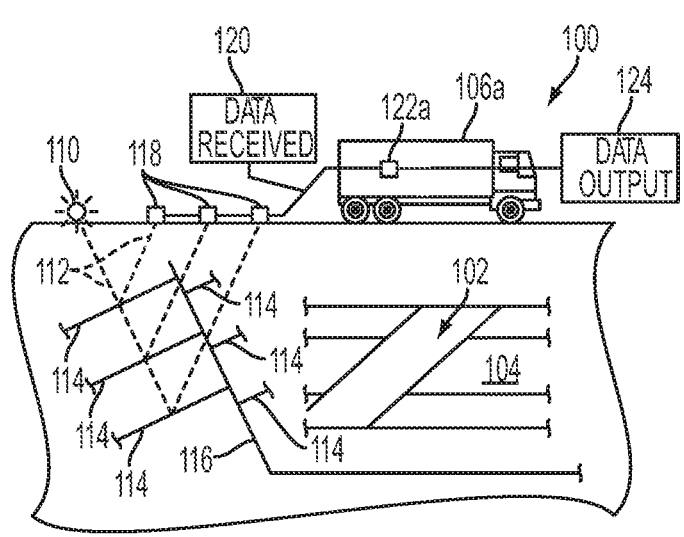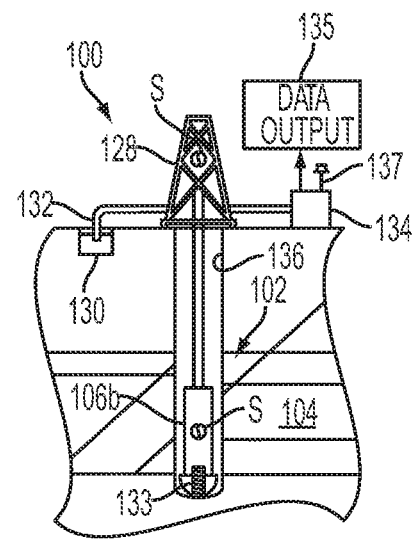
FIG. 1A  FIG. 1B
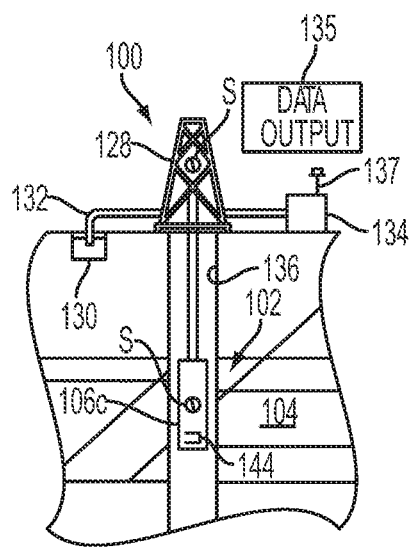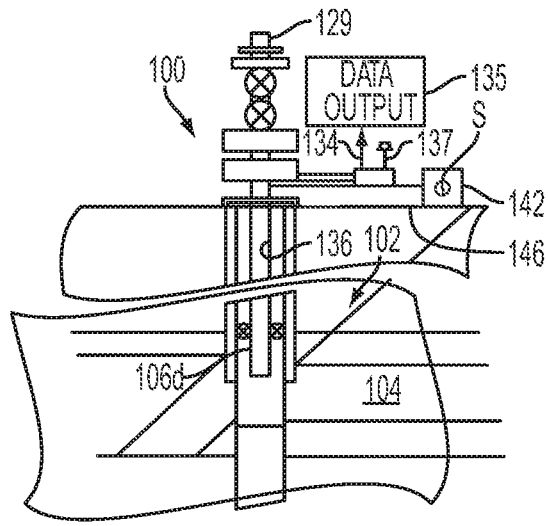
FIG. 1C  FIG. 1D

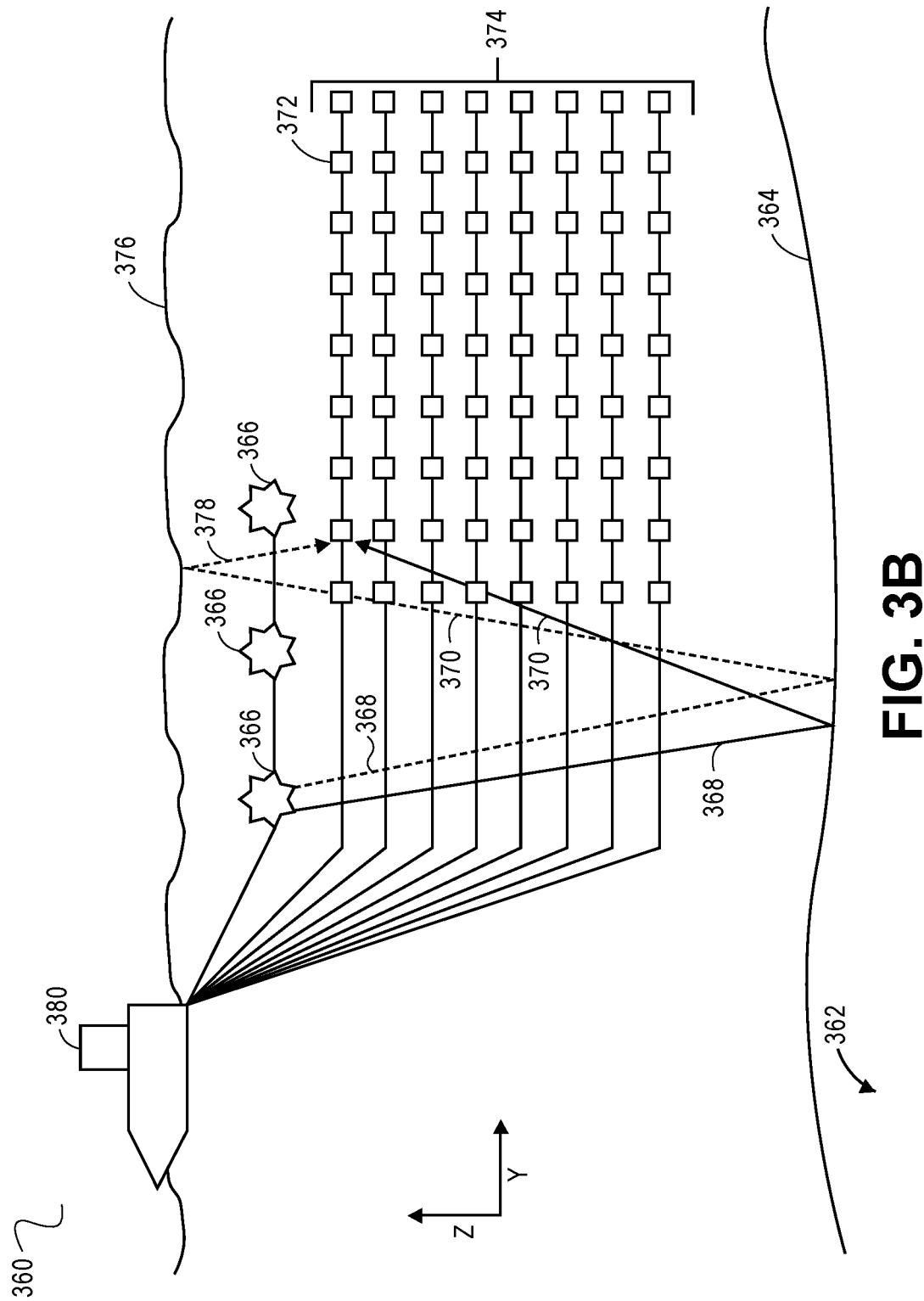

INTERPOLATION OF SEISMIC DATA WITH TIME VARIANT LOCATIONS

BACKGROUND

When interpolating and regularizing seismic data, the data is assumed to be measured at a constant location over time. Generally, standard seismic traces normally have one set of coordinates, representing the location at the time when a source starts emitting energy. By using these time-invariant locations, the interpolation and regularization may be done per frequency slice, which allows different interpolation methods. In some applications, for P-wave and S-wave (PS) data, a conversion point may be used as one of the coordinates to interpolate the data, and this conversion point may vary as a function of time. Additionally, the actual locations of the sources or receives may vary with time. For example, in a marine setting, a marine vibrator moves while it emits energy, and receivers in a streamer move while recording data.

Workarounds exist to handle these time-variant locations. For PS data, the time variant coordinate may be handled as multiple short traces each with constant locations. For standard marine towed streamer data, a separate motion correction may be done, but this may not be straightforward if there are multiple sources being recorded by the same receivers or if the cable is not towed in a straight line. These workarounds, however, may not accurately consider conversion points or source and receiver coordinates that vary with time in seismic data interpolation.

SUMMARY

Embodiments of the disclosure may provide a method for processing seismic data. The method includes receiving seismic data representing a subsurface volume. The method also includes determining, for the seismic data, analysis coordinates as a function of time. One or more of the analysis coordinates may vary in position over time. The method includes performing at least one of an interpolation or regularization process on the seismic data based at least partially on the analysis coordinates. The method also includes outputting a result of the at least one of the interpolation or regularization process.

In an embodiment, the method also includes performing a drilling process based at least partially on the result of the at least one of the interpolation or regularization process.

In an embodiment, determining the analysis coordinates includes determining conversion points by ray tracing based at least partially on a path of energy traveling from a source to a receiver used to generate and collect the seismic data.

In an embodiment, determining the analysis coordinates includes determining an actual location of at least one of a source or a receiver used to generate and collect the seismic data.

In an embodiment, the interpolation or regularization process includes a Fourier interpolation process.

In an embodiment, the method also includes separating a portion of the seismic data based at least partially on the seismic data being received from multiple sources.

In an embodiment, the method also includes performing a deghosting operation on the seismic data.

Embodiments of the disclosure may also include a computing system including one or more processors, and a memory system including one or more non-transitory media storing instructions that, when executed by at least one of the one or more processors, cause the computing system to perform operations. The operations include receiving seismic data representing a subsurface volume. The operations also include determining, for the seismic data, analysis coordinates as a function of time. One or more of the analysis coordinates may vary in position over time. The operations include performing at least one of an interpolation or regularization process on the seismic data based at least partially on the analysis coordinates. The operations also include outputting a result of the at least one of the interpolation or regularization process.

Embodiments of the disclosure may further include a non-transitory medium storing instructions that, when executed by at least one processor of a computing system, cause the computing system to perform operations. The operations include receiving seismic data representing a subsurface volume. The operations also include determining, for the seismic data, analysis coordinates as a function of time. One or more of the analysis coordinates may vary in position over time. The operations include performing at least one of an interpolation or regularization process on the seismic data based at least partially on the analysis coordinates. The operations also include outputting a result of the at least one of the interpolation or regularization process.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DETAILED DESCRIPTION

Figure 2:
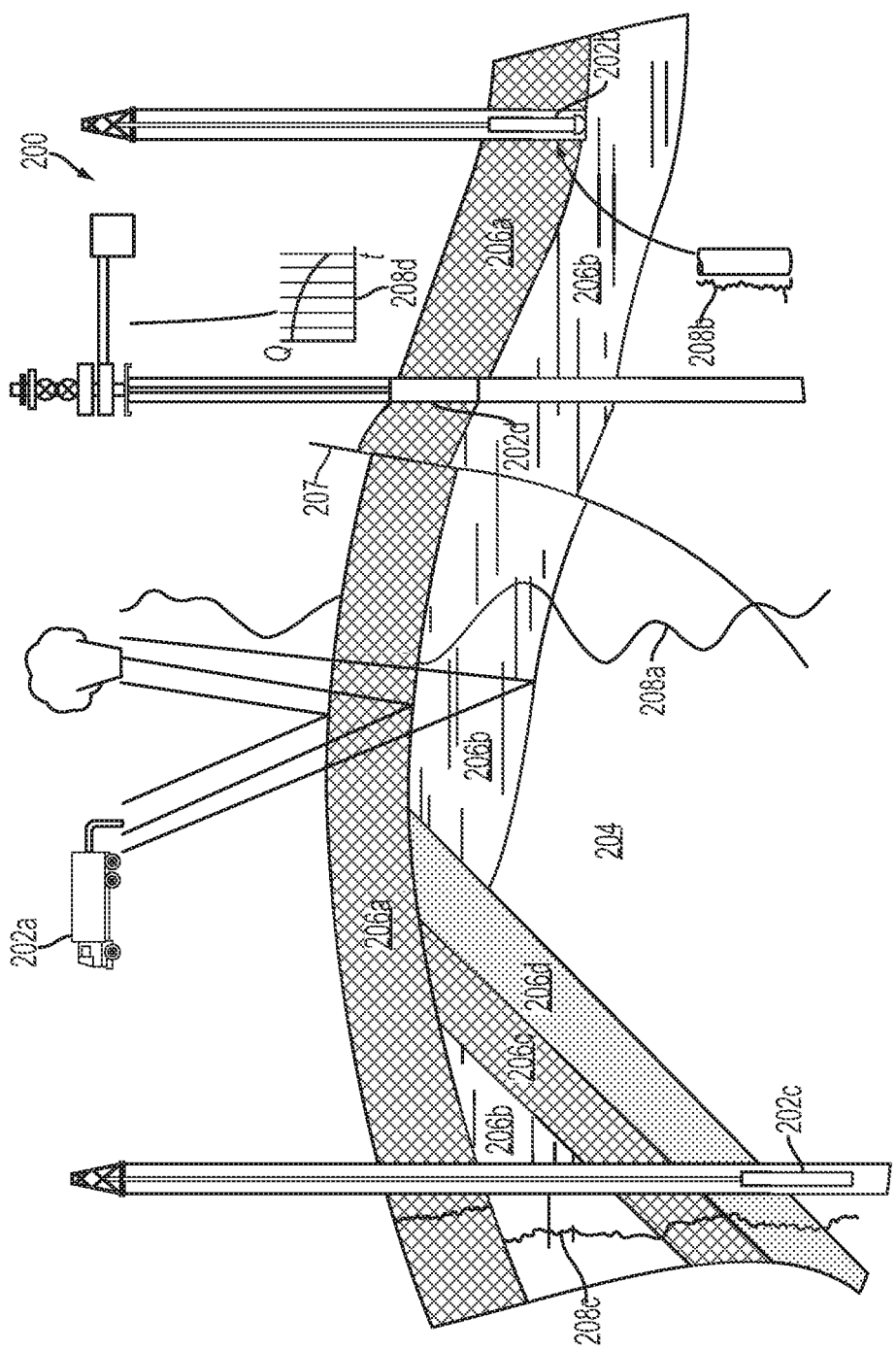

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106 to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
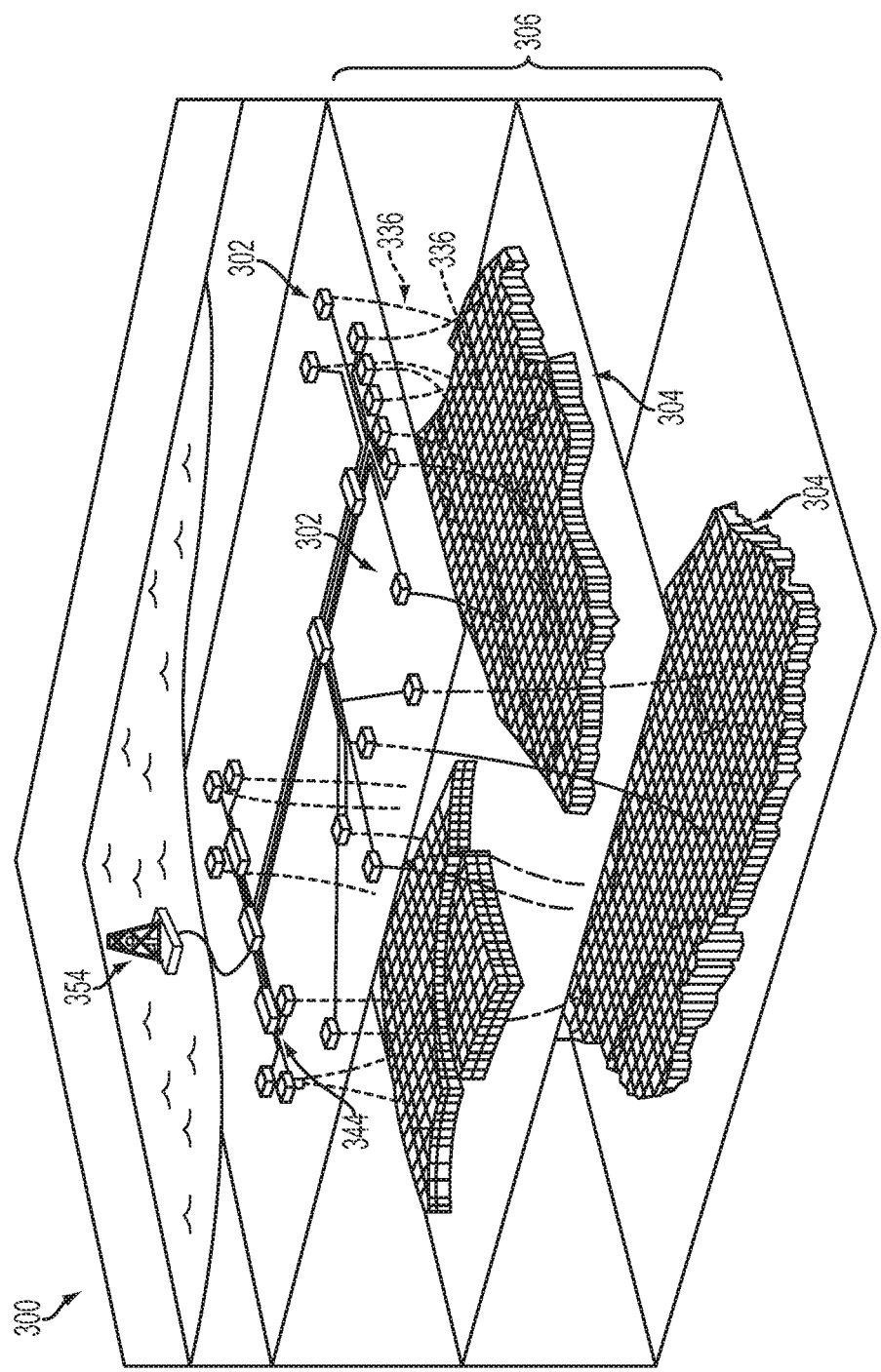

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

In embodiments, the seismic data captured by the systems described above may include time-variant seismic data. In an embodiment, an interpolation and/or regularization process may be utilized that addresses the time-variant seismic data. By utilizing the time-variant seismic data, interpolation and/or regularization process may prevent approximation errors in handling seismic data, for example, PS seismic data. Additionally, for marine towed streamer seismic data, the interpolation and/or regularization process may address source and receiver motion and multiple simultaneous marine vibrator sources. By addressing the time-variant seismic data and possible source or receiver motion, subsurface formations may be more accurately analyzed.

Figure 4:
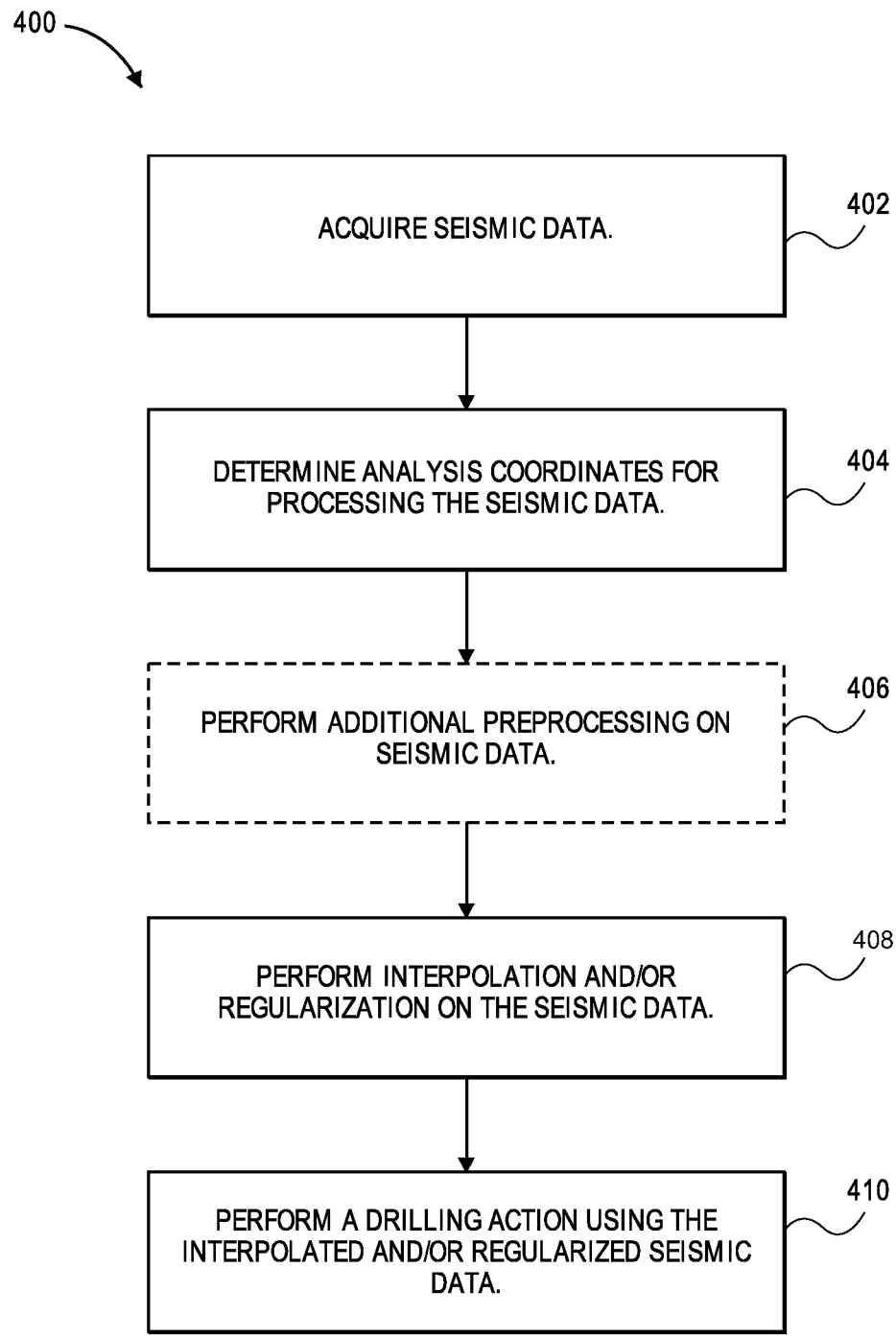
FIG. 4 illustrates a flowchart of a method for processing seismic data with time variant locations, according to an embodiment.

FIG. 4 illustrates a flowchart of a method 400 for seismic processing, according to an embodiment. In particular, the method 400 illustrated may be used for processing seismic data that includes time variant locations.

Accordingly, the method 400 may begin by acquiring seismic data, as at 402. The seismic data may be acquired by generating and recording seismic waves that are propagated through a subterranean domain (e.g., a subterranean volume), reflected from reflectors (e.g., interfaces between different types of formations). This recording (or traces) can be accomplished using recording devices, such as geophones, hydrophones, or the like, as described above.

In one example, the seismic data may be received from receivers 372 as shown in FIG. 3B. While being towed, each receiver 372 may continuously record the seismic data it receives from reflections 370. The seismic data received by each receiver 372 may be characterized according to a function of time and space. The time may represent the time at which the seismic data was received or acquired, and the space may indicate a position on the earth where the seismic data was received or acquired.

In another example, the seismic data may be received from receivers 118 as shown in FIG. 1A. In this example, sound vibration 112 generated by the source 110 reflects off horizons 114 in earth formation 116. A set of sound vibrations may be received by sensors, such as geophone-receivers 118, situated on the earth's surface. The seismic data received by each receiver 118 may be characterized according to a function of time and space. The time may represent the time at which the seismic data was received or acquired, and the space may indicate a position on the earth where the seismic data was received or acquired.

In one example, the seismic data may be been previously recorded, whether in a marine or land environment, and retrieved from storage for application to the method 400.

The method 400 may also include determining analysis coordinates for processing the seismic data, as at 404. The analysis coordinates may vary as a function of time in the seismic data.

Figure 5A:
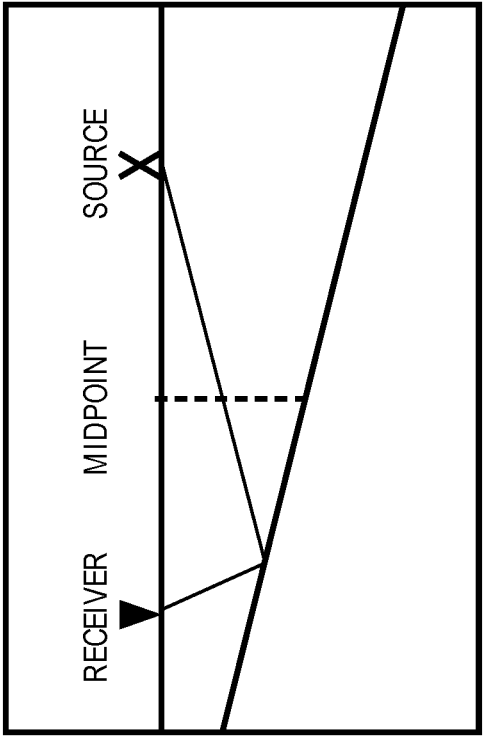
FIGS. 5A-5D illustrate conceptual views of a seismic ray and conversion points, according to an embodiment.
Figure 5B:
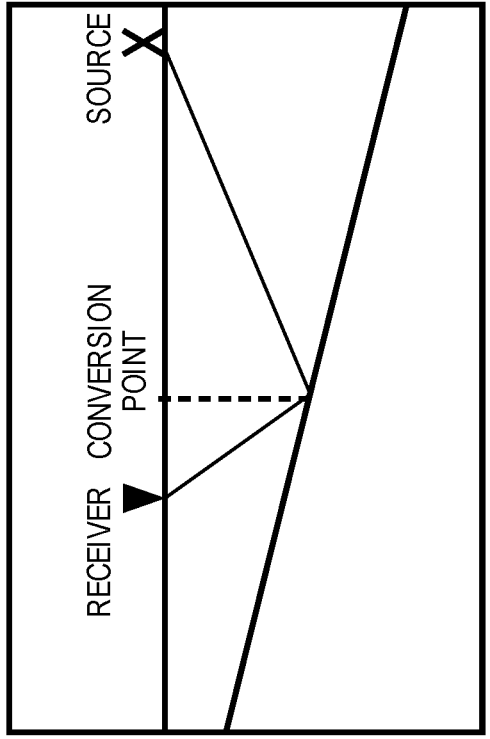
Figure 5C:
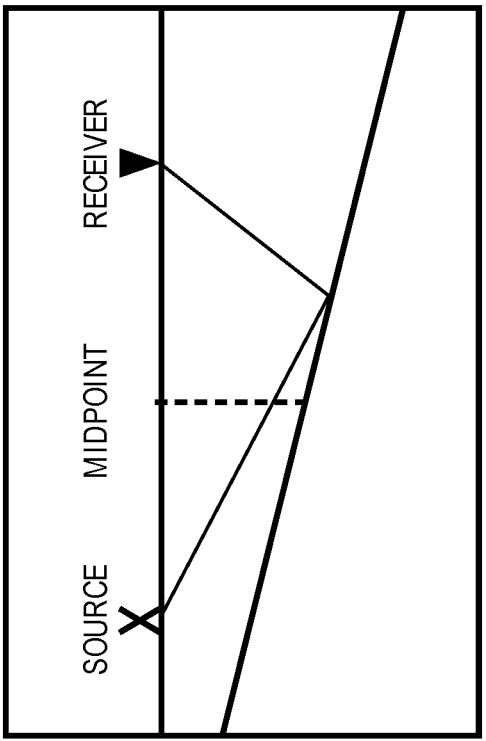
Figure 5D:
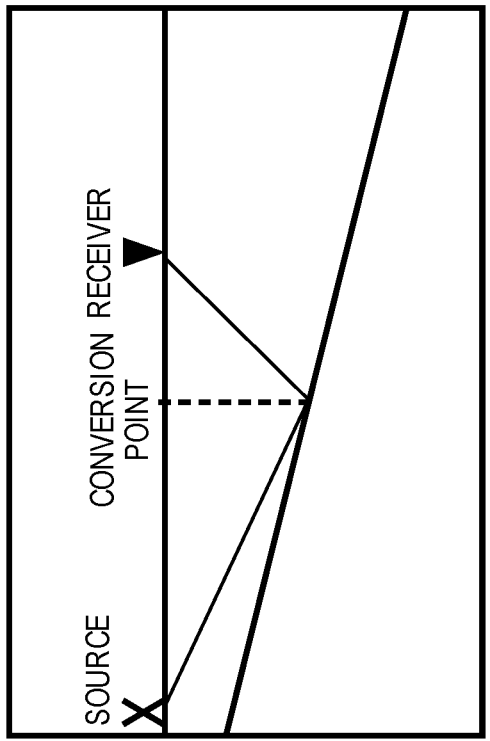

In an embodiment, the analysis coordinates may include one or more conversion points. The analysis coordinates for processing the seismic data may be the conversion point-x/y, azimuth and absolute offset. The conversion points for the seismic data (e.g., PS data) may, for example, be determined using a subsurface model with Vp and Vs velocities in combination with ray-tracing, as illustrated in FIGS. 5A-5D. In particular, FIGS. 5A and 5B illustrate ray paths for traces with the same midpoint and absolute offset but 180 degree different azimuths. FIGS. 5C and 5D illustrate for traces with the same conversion point and absolute offsets but 180 degree different azimuth. Azimuthal variations may be expected to be smaller than in the midpoint-x/y, absolute offset, azimuth domain. Two traces with the same conversion point and absolute offset, but different azimuths may have more similar lengths of ray-paths (and two-way travel times) than two traces with the same midpoint and absolute offset, but different azimuths. In one example, a constant Vp/Vs ratio, which may be analytical expression, may be used to compute the conversion point locations.

In another embodiment, the analysis coordinates may include the actual locations of the sources and receivers. The location of the sources and receivers may vary as a function of time. The locations of the sources and receives may be determined using data from the seismic collection process. For example, in the marine environment, the vessel 380 or the streamer array 372 may include a global position system (GPS) that measures the locations of the vessel 380 and the streamer array 372. Likewise, other location data such as the velocity of the vessel 380 and the positioning of the sources 366 and receivers 370 (e.g., length of the streamer array 372 and location of the source/receiver on the streamer array 372) may be collected. In another example, in the land environment, the sources 110, the receivers 118, and/or the seismic truck 106a may include a GPS that measures the locations of the sources 110, the receivers 118, and/or the seismic truck 106a. Other location data such as the velocity of the seismic truck 106a and the positioning of the sources 110 and the receivers 118 relative to the seismic truck 106a may be collected.

Based on the location data (e.g., GPS data and other location data), the location of the source/receiver may be determined for each seismic trace recorded. The location data may include absolute positions of the sources and the receiver for each recorded seismic trace. The location data may also include the relative positions of the sources and the receiver for each recorded seismic trace.

In another embodiment, the analysis coordinates may include the actual locations of the sources and receivers transformed to a midpoint and offset coordinates in a midpoint-offset domain (e.g., midpoint-x/y, absolute offset, azimuth domain). The midpoint and offset coordinates may vary over time.

The method 400 may also optionally include performing additional preprocessing on the seismic data, as at 406. The preprocessing may include any data conditioning or processing that may improve the interpolation and/or regularization of the seismic data.

In one example, the seismic data that includes seismic traces recorded for multiple simultaneous sources may be separated. The seismic data that includes simultaneous sources may be handled by separating the source records as a pre-processing step. For instance, the time-variant locations may be utilized in an active source separation scheme, for example, based on a (time or frequency domain) Radon transform. For a time domain transform, the events may be localized in time by deconvolution (or "correlation") with a seismic sweep. The deconvolution may create a Radon domain that is sparse. In another example, a forward model may be determined that includes a convolution with a seismic sweep. In this example, the sparse Radon domain may be solved by inversion.

In another example, the preprocessing steps may include preforming noise reduction on the seismic data. In another example, the preprocessing steps may include preforming deghosting procedures or processes on the seismic data.

In an embodiment, the one or more of preprocessing steps may be performed during the interpolation and/or regularization of the seismic data, as discussed below.

The method 400 may also include performing interpolation and/or regularization on the seismic data, as at 408. The interpolation and/or regularization may allow the seismic data to be analyzed, processed, and enhanced to highlight features and points of interest of a subsurface volume represented in the seismic data. The interpolation and/or regularization can be configured to utilize the seismic data with time-variant locations. For example, the interpolation and/or regularization may be a five-dimensional (5D) process, taking into account time and spatial locations for the analysis coordinates of the seismic data, whether the source and receiver coordinates are static or vary in both x and y locations. Likewise, for example, the interpolation and/or regularization may be a lower dimensional (e.g., 2D, 3D, 4D) process.

In an embodiment, Fourier interpolation may be performed as part of the interpolation and regularization. For example, a matching pursuit Fourier interpolation may be performed that utilizes the seismic data with time-variant locations, as described further below. For the seismic data with time-variant locations, in the Fourier interpolation, a single Fourier transform may be performed to transform the seismic traces from the (time, space) domain to the (frequency, wavenumber) domain. Once transformed to the (frequency, wavenumber) domain, the seismic data may be processed to form an estimated spectrum. Then, an inverse Fourier transform may be applied to the estimated spectrum to obtain the interpolated seismic data.

In another example, Radon interpolation and/or regularization may be performed on the seismic data. For instance, a time-domain Radon transform or a frequency-domain Radon transform may be utilized. The frequency-domain Radon transform may utilize a single transform to transform the seismic data from the (space, time) domain to (slowness, frequency) domain. The time-domain Radon transform may utilize a single transform to transform the seismic data from the (space, time) domain to (slowness, zero-offset-intercept time) domain.

Figure 6B:
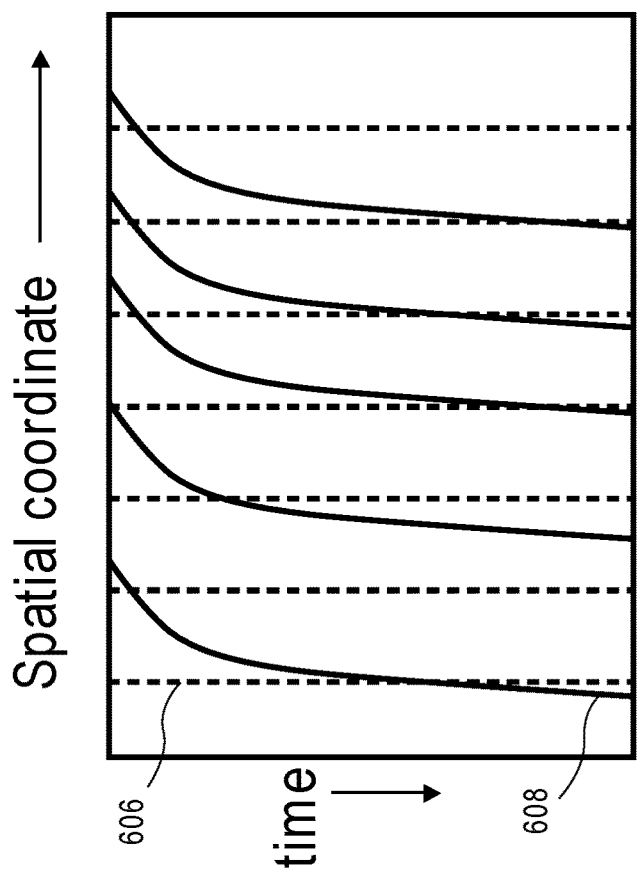
FIGS. 6A and 6B illustrate conceptual views of output from the interpolation and regularization process for both time-variant and time-invariant seismic data, according to an embodiment.
Figure 6A:
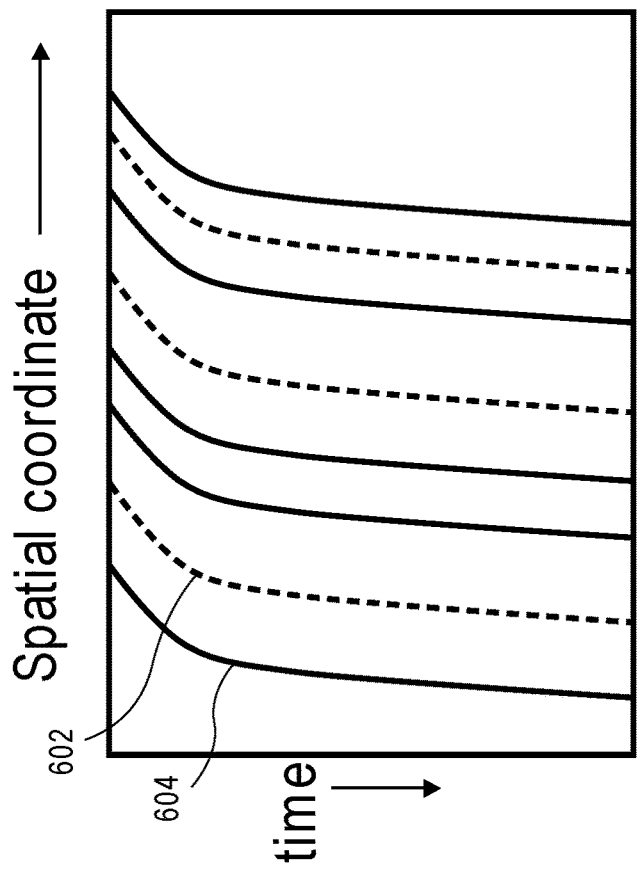

FIGS. 6A and 6B illustrate the output from the interpolation and/or regularization process for both time-variant and time-invariant seismic data. As illustrated in FIG. 6A, curves 602 represent the interpolated seismic data as compared with the recorded seismic data represented as curves 604. As illustrated, the conversion point locations that would occur for a specific combination of source and receiver locations. FIG. 6B illustrates time-invariant locations for output, even though for seismic data, it may not physically be possible to measure traces with such time-invariant conversion points. As illustrated, it may possible to interpolate to the time-variant conversion points (curve 608) that occur for a newly created trace (curve 606) with constant source and receiver coordinates.

In an embodiment, one or more data conditioning processes may be performed during the interpolation and/or regularization. The data conditioning processes may improve the interpolation and/or regularization of the seismic data.

In one example, the seismic data that includes seismic traces recorded for multiple simultaneous sources may be separated. The seismic data that includes simultaneous sources may be handled by separating the source records. For instance, the time-variant locations may be utilized in an active source separation scheme, for example, based on a (time or frequency domain) Radon transform. For a time domain transform, the events may be localized in time by deconvolution (or "correlation") with a seismic sweep. The deconvolution may create a Radon domain that is sparse. In another example, a forward model may be determined that includes a convolution with a seismic sweep. In this example, the sparse Radon domain may be solved by inversion.

In another example, the data conditioning processes may include preforming noise reduction on the seismic data. In another example, the data conditioning processes may include preforming deghosting procedures or processes on the seismic data.

The method 400 may also include performing a drilling action using the interpolated and/or regularized seismic data, as at 410. In an embodiment, the drilling action may include selecting a location to drill a wellbore. In another embodiment, the drilling action may include selecting a different location to drill the wellbore from an existing wellbore. In another embodiment, the drilling action may include varying a trajectory of a downhole tool to vary a trajectory of a wellbore in response to the interpolated and/or regularized seismic data. In another embodiment, the drilling action may include varying the methodology and/or technology used for drilling and/or recovery. In another embodiment, the drilling action may include varying a weight-on-bit ("WOB") of the downhole tool at one or more locations in the subterranean formation in response to the interpolated and/or regularized seismic data. In another embodiment, the drilling action may include varying a flow rate of fluid being pumped into the wellbore in response to the interpolated and/or regularized seismic data. In another embodiment, the drilling action may include varying a type (e.g., composition) of the fluid being pumped into the wellbore in response to the interpolated and/or regularized seismic data. In another embodiment, the drilling action may include measuring one or more additional properties in the subterranean formation using the downhole tool in response to the interpolated and/or regularized seismic data. In another embodiment, the drilling action may include performing additional seismic surveys based in response to the interpolated and/or regularized seismic data.

Figure 7:
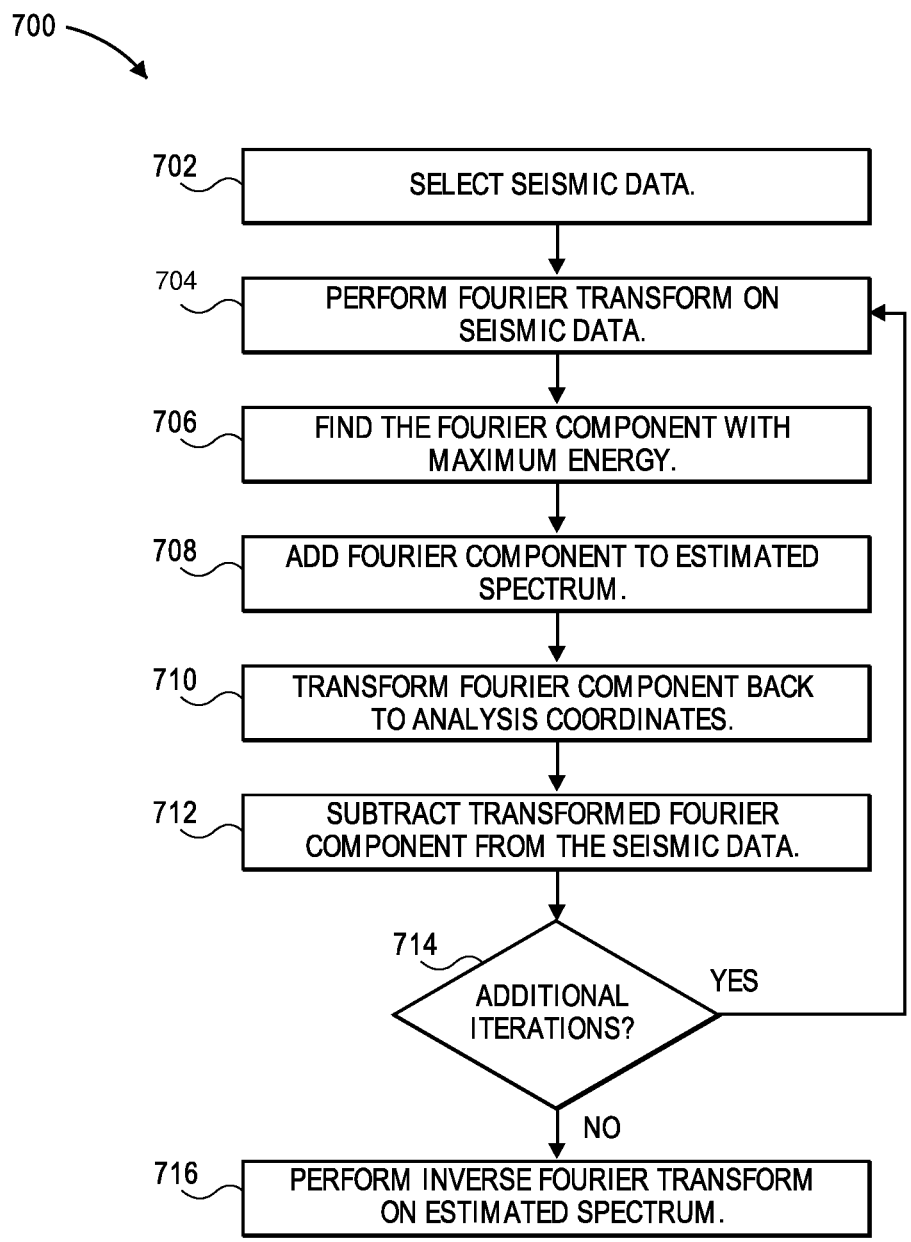
FIG. 7 illustrates a flowchart of a method for performing Fourier interpolation and regularization, according to an embodiment. The method for performing Fourier interpolation and regularization may be part of an embodiment of the method processing seismic data with time variant locations, e.g., as illustrated in FIG. 4.

FIG. 7 illustrates a flowchart of a method 700 for performing Fourier interpolation and regularization, according to an embodiment. For example, the Fourier interpolation and regularization may include a matching pursuit Fourier interpolation. The method for performing Fourier interpolation and regularization may be part of an embodiment of the method processing seismic data with time variant locations, e.g., as illustrated in FIG. 4.

The method 700 may include selecting seismic data, as at 702. The seismic data may be selected from the seismic data received at 402. In an example, the seismic data can include multiple seismic traces. In another example, the seismic data can include other data such as the analysis coordinates determined at 404.

The method 700 may also include performing a Fourier transform on the seismic data, as at 704. In an embodiment, a single Fourier transform may be performed to transform the seismic traces from the (time, space) domain to the (frequency, wavenumber) domain. For example, to handle time-variant locations, the following forward transform may be used for 3D interpolation as an example:

$$P(k_1,k_2,\omega) = \Sigma_{l=0}^{L-1} P(x_{1,l}, x_{2,l}, t_l) e^{j(k_1 x_{1,l} + k_2 x_{2,l} - \omega t_l)} \Delta S_l,$$

where L is the total number of samples in the space time domain (number of traces times number of samples per trace) and $\Delta S_l$ is an elementary area corresponding to one sample in the space-time domain $(x_{1,l}, x_{2,l}, t_l)$. This transform may be extended to any dimensionality (e.g., 2D, 4D, 5D).

The method 700 may also include determining the Fourier component with maximum energy, as at 706. For example, for the transformed seismic data, each Fourier component may be compared, and the Fourier component with the maximum energy may be determined.

The method 700 may also include adding the Fourier component to the estimated spectrum, as at 708. The method 700 may also include transforming the Fourier component back to the analysis coordinates, as at 710. In an embodiment, a single inverse Fourier transform may be performed to transform the Fourier component from the (frequency, wavenumber) domain to the (time, space). For example, the inverse transform may be:

$$P(x_1, x_2, t) = \frac{\Delta S_F}{8\pi^3} \sum_{k=0}^{K-1} P(k_{1,k}, k_{2,k}, \omega_k) e^{-j(k_{1,k} x_1 + k_{2,k} x_2 - \omega_k t)},$$

where K is the total number of samples in the wavenumber-frequency domain and $S_F$ is an elementary area in the wavenumber frequency domain corresponding to one ($k_1$, $k_2$, $\omega$) sample. This transform may be extended to any dimensionality (e.g., 2D, 4D, 5D). In an embodiment, the Fourier component may be transformed using the analysis coordinates, for example, as determined in 404, as illustrated in FIG. 4.

The method 700 may also include subtracting the transformed Fourier component from the seismic data, as at 712. For example, the transformed Fourier component may be subtracted from the seismic data to remove the component from the seismic data and allow additional components to be identified in further iterations.

The method 700 may also include determining whether additional iterations should be performed on the seismic data, as at 714. In an embodiment, the method 700 may be performed for a predetermined number of iterations. In another embodiment, the method 700 may be performed for a number of iterations until a sufficient number of components have been identified and a sufficient estimated spectrum has been generated. If additional processing is to be performed, the method 700 may return to 708 and use the seismic data determined at 712 for the next iteration.

If no additional iterations are to be performed, the method 700 may also perform an inverse Fourier transform on the estimated spectrum for locations/coordinates, as at 716. In an embodiment, the locations/coordinates may be new location/coordinates, e.g., a regular grid. In another embodiment, the locations/coordinates may be the analysis coordinates. In an embodiment, a single inverse Fourier transform may be performed to transform the Fourier component from the (frequency, wavenumber) domain to the (time, space). For example, the inverse transform may be:

$$P(x_1, x_2, t) = \frac{\Delta S_F}{8\pi^3} \sum_{k=0}^{K-1} P(k_{1,k}, k_{2,k}, \omega_k) e^{-j(k_{1,k} x_1 + k_{2,k} x_2 - \omega_k t)},$$

where K is the total number of samples in the wavenumber-frequency domain and $S_F$ is an elementary area in the wavenumber frequency domain corresponding to one ($k_1$, $k_2$, $\omega$) sample. The samples in the space-time domain, ($x_{1,l}$, $x_{2,l}$, $t_l$), now represent the new locations, for example a regular grid.

While FIG. 7 describes a matching pursuit Fourier interpolation, any type of interpolation and/or regularization may be performed on the seismic data. For example, any type of inversion may be used such as least-squares inversion or basis pursuit. In another example, other transforms than the Fourier transform may be used. For example Radon interpolation and/or regularization may be performed on the seismic data. For instance, a time-domain Radon transform or a frequency-domain Radon transform may be utilized. The frequency-domain Radon transform may utilize a single transform to transform the seismic data from the (space, time) domain to (slowness, frequency) domain. The time-domain Radon transform may utilize a single transform to transform the seismic data from the (space, time) domain to (slowness, zero-offset-intercept time) domain.

The method 700, as illustrated in FIG. 7, or other interpolation and/or regularization method may include one or more data conditioning processes. The data conditioning processes may improve the interpolation and/or regularization of the seismic data. In one example, the seismic data that includes seismic traces recorded for multiple simultaneous sources may be separated. The seismic data that includes simultaneous sources may be handled by separating the source records. For instance, the time-variant locations may be utilized in an active source separation scheme, for example, based on a (time or frequency domain) Radon transform. For a time domain transform, the events may be localized in time by deconvolution (or "correlation") with a seismic sweep. The deconvolution may create a Radon domain that is sparse. In another example, a forward model may be determined that includes a convolution with a seismic sweep. In this example, the sparse Radon domain may be solved by inversion. In another example, the data conditioning processes may include preforming noise reduction on the seismic data. In another example, the data conditioning processes may include preforming deghosting procedures or processes on the seismic data.

Figure 8:
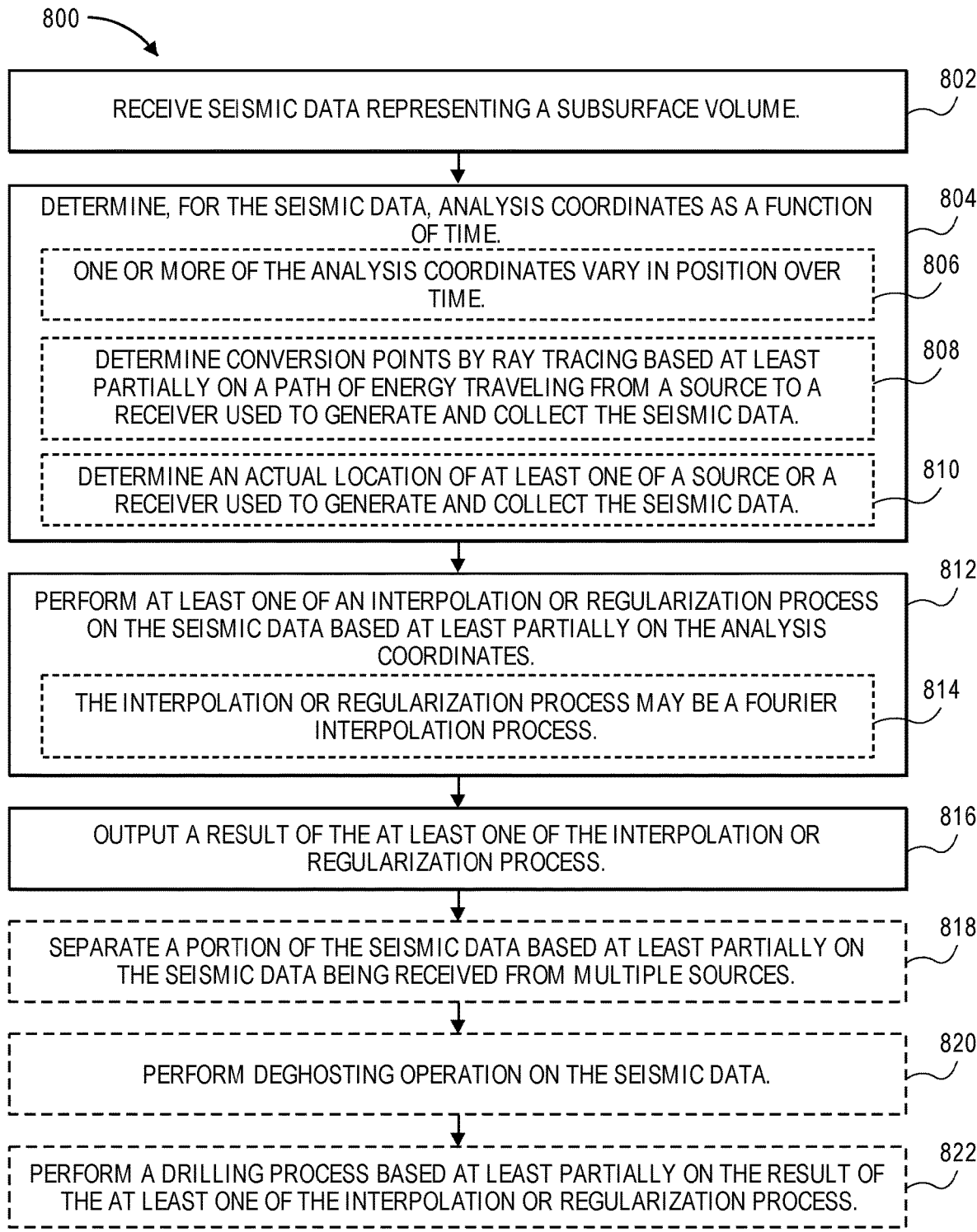
FIG. 8 illustrates a flowchart of a method for processing seismic data with time variant locations, according to an embodiment.

FIG. 8 illustrates a flowchart of a method 800 for seismic processing, according to an embodiment. As illustrated, the method 800 may include receiving seismic data representing a subsurface volume, as at 802 (e.g., FIG. 4, 402, acquire seismic data).

The method 800 may include determining, for the seismic data, analysis coordinates as a function of time, as at 804 (e.g., FIG. 4, 404, determine analysis coordinates for processing the seismic data). One or more of the analysis coordinates may vary in location over time, as at 806 (e.g., FIG. 4, 404, determine analysis coordinates for processing the seismic data, FIG. 5A-5D). The method 800 may also include determining conversion points by ray tracing based at least partially on a path of energy traveling from a source to a receiver used to generate and collect the seismic data, as at 808 (e.g., FIG. 4, 404, determine analysis coordinates for processing the seismic data, FIGS. 5A-5D). The method 800 may also include determining an actual location of at least one of a source or a receiver used to generate and collect the seismic data, as at 810 (e.g., FIG. 4, 404, determine analysis coordinates for processing the seismic data, FIGS. 5A-5D).

The method 800 may include performing at least one of an interpolation or regularization process on the seismic data based at least partially on the analysis coordinates, as at 812 (e.g., FIG. 4, 408, perform interpolation and/or regularization on the seismic data, FIG. 7). The interpolation or regularization process may optionally be a Fourier interpolation process, as at 814 (e.g., FIG. 4, 408, perform interpolation and/or regularization on the seismic data, FIG. 7).

The method 800 may include outputting a result of the at least one of the interpolation or regularization process, as at 816.

The method 800 may optionally include separating a portion of the seismic data based at least partially on the seismic data being received from multiple sources, as at 818 (e.g. FIG. 4, 406, perform additional preprocessing on the seismic data).

The method 800 may optionally include performing a deghosting operation on the seismic data, as at 820 (e.g. FIG. 4, 406, perform additional preprocessing on the seismic data).

The method 800 may optionally include performing a drilling process based at least partially on the result of the at least one of the interpolation or regularization process, as at 822 (e.g., FIG. 4, 410, perform a drilling action using the interpolated and/or regularized seismic data).

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 9:
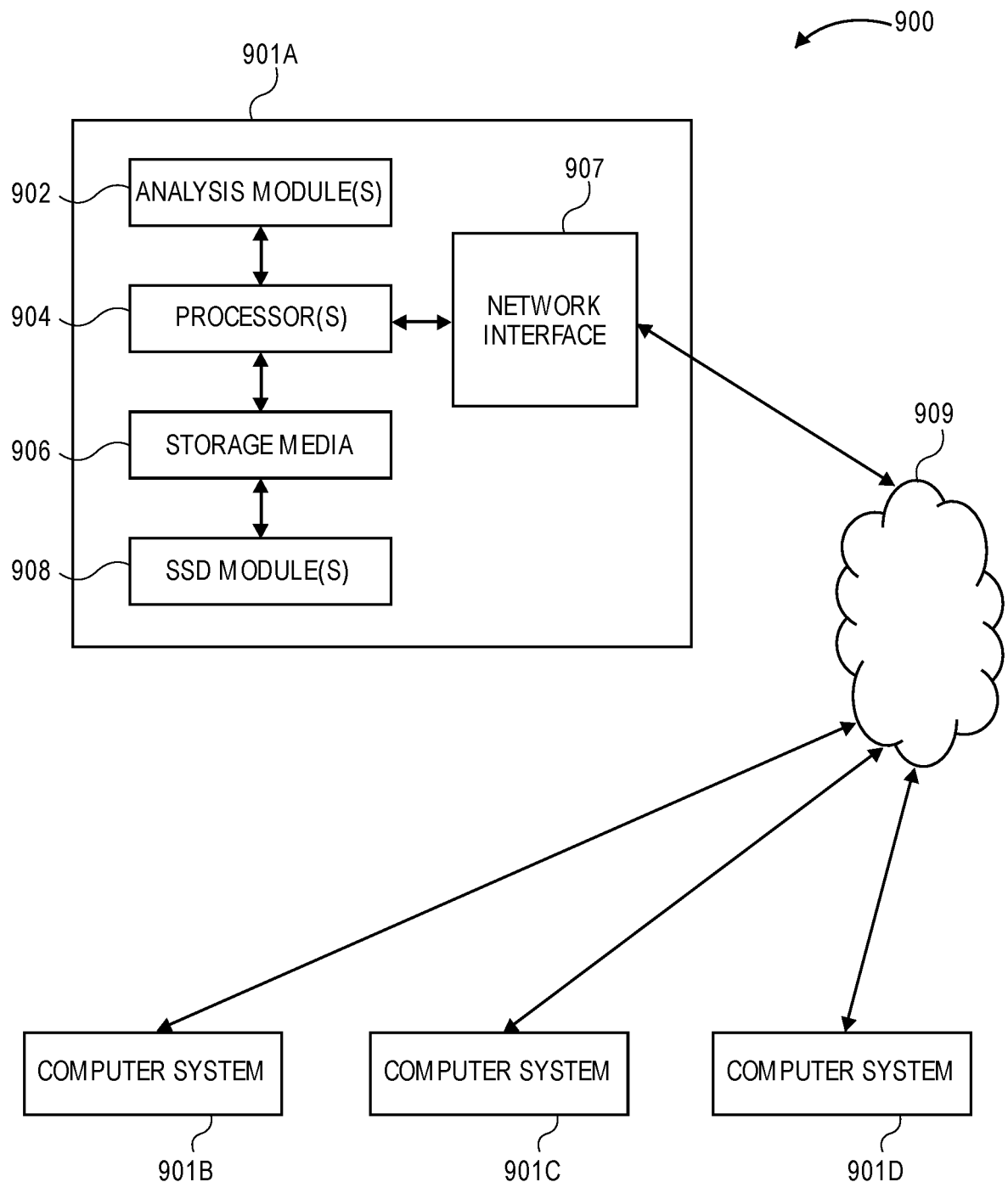
FIG. 9 illustrates a schematic view of a computing system, according to an embodiment.

In some embodiments, any of the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis module(s) 902 configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor can include a microprocessor, microcontroller, processor module or subsystem, programmable integrated circuit, programmable gate array, or another control or computing device.

The storage media 906 can be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 900 contains one or more interpolation module(s) 908. In the example of computing system 900, computer system 901A includes the interpolation module 908. In some embodiments, a single interpolation module may be used to perform some or all aspects of one or more embodiments of the methods. In alternate embodiments, a plurality of interpolation modules may be used to perform some or all aspects of methods.

It should be appreciated that computing system 900 is only one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 900, FIG. 9, and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for processing seismic data, comprising:
   receiving seismic data representing a subsurface volume;
   determining, for the seismic data, analysis coordinates as a function of time, wherein one or more of the analysis coordinates vary in position over time, wherein the one of more analysis coordinates includes a conversion point;
   performing at least one of an interpolation or regularization process on the seismic data based at least partially on the analysis coordinates;
   outputting a result of the at least one of the interpolation or regularization process; and
   performing a drilling action based at least partially on the result of the at least one of the interpolation or regularization process, wherein the drilling action comprises at least one of: varying a trajectory of a downhole tool to vary a trajectory of a wellbore, varying a weight-on-bit of a downhole tool, varying a flow rate of fluid being pumped into the wellbore, or varying a type of the fluid being pumped into the wellbore.

2. The method of claim 1, wherein determining the analysis coordinates comprises determining conversion points by ray tracing based at least partially on a path of energy traveling from a source to a receiver used to generate and collect the seismic data.

3. The method of claim 1, wherein determining the analysis coordinates comprises determining an actual location of at least one of a source or a receiver used to generate and collect the seismic data.

4. The method of claim 1, wherein the interpolation or regularization process comprises a Fourier interpolation process.

5. The method of claim 1, the method further comprising:
   separating a portion of the seismic data based at least partially on the seismic data being received from multiple sources.

6. The method of claim 1, the method further comprising:
   performing a deghosting operation on the seismic data.

7. A computing system, comprising:
   one or more processors; and
   a memory system comprising one or more non-transitory media storing instructions that, when executed by at least one of the one or more processors, cause the computing system to perform operations, the operations comprising:
   receiving seismic data representing a subsurface volume;
   determining, for the seismic data, analysis coordinates as a function of time, wherein one or more of the analysis coordinates vary in position over time, wherein the one of more analysis coordinates includes a conversion point;
   performing at least one of an interpolation or regularization process on the seismic data based at least partially on the analysis coordinates;
   outputting a result of the at least one of the interpolation or regularization process; and
   performing a drilling action based at least partially on the result of the at least one of the interpolation or regularization process, wherein the drilling action comprises at least one of: varying a trajectory of a downhole tool to vary a trajectory of a wellbore, varying a weight-on-bit of a downhole tool, varying a flow rate of fluid being pumped into the wellbore, or varying a type of the fluid being pumped into the wellbore.

8. The computing system of claim 7, wherein determining the analysis coordinates comprises determining conversion points by ray tracing based at least partially on a path of energy traveling from a source to a receiver used to generate and collect the seismic data.

9. The computing system of claim 7, wherein determining the analysis coordinates comprises determining an actual location of at least one of a source or a receiver used to generate and collect the seismic data.

10. The computing system of claim 7, wherein the interpolation or regularization process comprises a Fourier interpolation process.

11. The computing system of claim 7, the operations further comprising:
    separating a portion of the seismic data based at least partially on the seismic data being received from multiple sources.

12. The computing system of claim 7, the operations further comprising:
    performing a deghosting operation on the seismic data.

13. A non-transitory medium storing instructions that, when executed by at least one processor of a computing system, cause the computing system to perform operations, the operations comprising:
    receiving seismic data representing a subsurface volume;
    determining, for the seismic data, analysis coordinates as a function of time, wherein one or more of the analysis coordinates vary in position over time, wherein the one of more analysis coordinates including a conversion point;
    performing at least one of an interpolation or regularization process on the seismic data based at least partially on the analysis coordinates;
    outputting a result of the at least one of the interpolation or regularization process; and
    performing a drilling action based at least partially on the result of the at least one of the interpolation or regularization process, wherein the drilling action comprises at least one of: varying a trajectory of a downhole tool to vary a trajectory of a wellbore, varying a weight-on-bit of a downhole tool, varying a flow rate of fluid being pumped into the wellbore, or varying a type of the fluid being pumped into the wellbore.

14. The non-transitory medium of claim 13, wherein determining the analysis coordinates comprises determining conversion points by ray tracing based at least partially on a path of energy traveling from a source to a receiver used to generate and collect the seismic data.

15. The non-transitory medium of claim 13, wherein the interpolation or regularization process comprises a Fourier interpolation process.

16. The non-transitory medium of claim 13, the operations further comprising:
   separating a portion of the seismic data based at least partially on the seismic data being received from multiple sources.

17. The non-transitory medium of claim 13, the operations further comprising:
   performing a deghosting operation on the seismic data.

* * * * *